Patented June 22, 1926.

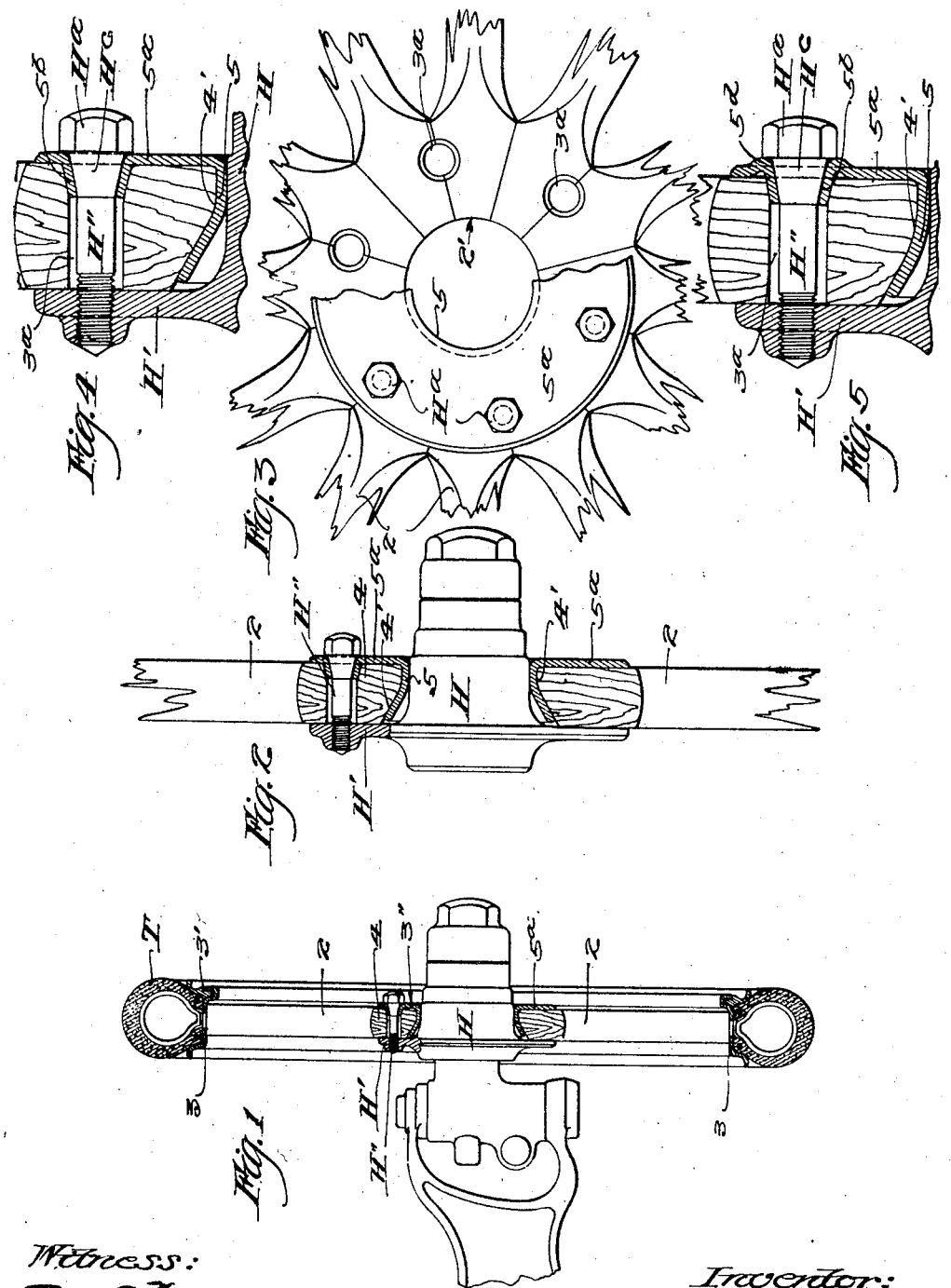

1,589,996

UNITED STATES PATENT OFFICE.

ARTHUR V. SOMERS, OF FLINT, MICHIGAN, ASSIGNOR TO BAKER WHEEL & RIM COMPANY, OF CHICAGO, ILLINOIS, A CORPORATION OF ILLINOIS.

WHEEL FOR AUTOMOBILES.

Application filed November 6, 1922. Serial No. 599,251.

This invention relates to wheels for motor vehicles, and has special reference to improvements upon the so-called Baker demountable wheel, as described and claimed in U. S. Patent No. 1,399,720, granted to E. K. Baker, December 6, 1921.

Wheels of the kind mentioned are characterized by wooden spokes which have inner ends that are mitered together and form a wooden hub center for the wheel. As well known, the outer ends of the spokes are held in a metal felloe or tire holding rim. The wooden hub center just mentioned contains a hole for the reception of the barrel portion of the metal vehicle hub. That hub has a hub flange against which the wooden hub center of the wheel is secured by a plurality of hub bolts.

My invention comprises the wooden wheel center composed of mitered spoke ends and containing the central hub hole with a combined wheel-center locking ring and facing plate, or outer flange, as defined in said Baker Patent No. 1,399,720, but in combination with hub bolts which are of a special form and which co-act with specially formed conical sinks or seats in the facing flange by which the wooden hub center of the wheel may be very securely driven or jammed against the back flange of the vehicle hub and the hub bolts so secured or locked as to preclude any loosening thereof while the vehicle is in use. Incidentally, my invention attains the result of providing hub bolts which, though securely locked when in tightened position, may be loosened by the first part-turn of the bolt with a wrench. A further important incident of my invention resides in a better reinforcement of the metal facing flange of the wheel.

My invention will be readily understood on reference to the accompanying drawings, in which; Fig. 1 is a vertical section of a motor vehicle wheel embodying my invention; Fig. 2 is an enlarged view of the flanged vehicle hub and the center portion of the wheel; Fig. 3 is an outer-faced view of the wheel with a portion of the facing flange broken away to disclose the construction of the spoke ends that constitute the wooden hub center of the wheel; Fig. 4 is a further enlargement of portions of the hub barrel, the hub flange, the wheel center, and a hub bolt, taken from Fig. 2; and Fig. 5 is a like sectional detail illustrating a slightly modified form of my invention.

The particular wheel shown in Fig. 1 comprises the radial wooden spokes, 2, and the fixed rim, 3, the latter being an endless ring of metal having suitable tire-holding flanges and, in its base portion, receiving the end tenons of the wooden spokes, 2. The wheel is further characterized by the hub center, 2', composed of the mitered spoke butts, 4. These are compressed and firmly seated one against the other in the process of making the wheel. After assembly, such wheels are centrally bored to form a hub-hole, 4'.

In the application of my invention, as in the aforesaid Baker patent, the back portion of the hub center adjacent the hub-hole, 4', is beveled or tapered to receive a metal ring which interlocks the several spoke ends.

The wheel is mounted upon an automobile hub, H, which has a fixed back flange, H', and is secured thereto by means of a plurality of hub bolts, H''.

Commonly, every hub has an outside or detachable hub flange, which engages the outer side of the wheel when the latter is placed on the hub. As will appear, the outer detachable hub flange is now dispensed with, and there is substituted directly upon the wheel, a combined centering or locking ring, 5, and facing flange, 5ª. The portion, 5, occupies and is expanded within the tapered hub hole, 4', while the portion, 5ª, by the same operation of applying it to the wheel, is pressed against the outer face of the wooden hub center of the wheel.

When the wheel is placed on the vehicle hub and against the back flange of the latter, it is firmly secured in that position, (pressed against the back flange, H'), by the bolts, H'', which pass through the metal facing flange, 5ª, and have their ends threaded in the back flange, as well shown in the drawings.

Up to this point my invention has followed that of Patent No. 1,399,720. I depart from it in the following respects.

In addition to a head, Hª, I provide each hub bolt with a conical jamming portion, H$^c$, the utility of which will be apparent from the drawing. Also, for each hub bolt I provide the wheel with a bolt hole, 3ª, which is very considerably larger than the threaded shank of the bolt. And for each bolt I provide the metal facing flange, 5ª, with an inturned conical sink or seat, 5ᵇ, which fits the conical portion, Hᶜ, of the bolt. The conical seats are formed by punching and drawing out the metal plate or flange, 5ª. These parts, 5ᵇ occupy the outer ends of respective bolt holes, 3ª, and thus the facing flange, 5ª, is effectively interlocked with the wooden hub center of the wheel and cannot turn thereon.

The large holes, 3ª, make it unnecessary to precisely register them with the threaded holes in the hub flange, H′, when the wheel is being placed on the hub; because the larger holes, 3ª, instead of fixing the position of the bolt when first inserted, allow the end of the bolt to move sideways therein and easily "find" the threaded hole in the back flange. Hence it becomes an easy matter to place the first bolt, and then, all of the others. This simple invention affords much comfort to the person making a change of wheels; that is, taking off one wheel and putting another on the vehicle hub.

By this invention, when the bolts are screwed into the back flange of the hub, their conical parts, Hᶜ, and not alone their heads, Hª, are firmly seated against the metal flange, 5ª, and within the conical sinks or seats thereof. Thus, at one and the same time, the wheel is jammed tightly against the back flange of the hub and each bolt is so firmly jammed in its conical seat as to prevent its loosening except under the back-turning action of a wrench.

In practice I prefer that each wheel shall have six of the described hub bolts, but a larger or a smaller number may be used, according to the service that the motor vehicle is expected to perform.

Obviously, the described construction does not sacrifice any part of the end thrust of the bolts against the wheel; and hence, the bolts serve to both thrust and hold the hub center against the metal back flange, H′, with such force that the resulting friction between these parts is more than sufficient to prevent the wheel from slipping or rotating on the hub. As will be apparent, I employ this fact to make the bolt holes, 3ª, in the wheel, much larger than the hub bolts, with the advantages above set forth, and with the further advantage of removing the bolts from shear relation between the wheel and hub flange.

A further distinct advantage of my invention lies in the strengthening or reinforcing function of the conical pressed parts, 5ᵇ, which stiffen the facing flange, 5ª. This last mentioned advantage may be accentuated by externally ribbing the facing flange, as depicted at, 5ᵈ, in Fig. 5.

The numerous advantages of my invention and the desirable results obtained thereby will be readily appreciated by those who are skilled in the art. My invention has certain broad adaptations to wooden wheel centers, and therefor is not specifically limited to the precise structures herein shown and described.

Having thus described my invention, I claim as new and desire to secure by Letters Patent:

In a vehicle wheel the combination of a hub barrel and back flange, a wood wheel hub center in engagement with the back flange and having a plurality of bolt holes therein, a metal facing for the wood hub center having a plurality of projecting portions extending into said bolt holes, said projecting portions having tapered openings therein, a plurality of bolts, each having a tapered portion adjacent one end, which coact with the tapered openings of the metal facing, said back flange having threaded openings therein to receive the threaded ends of the bolts.

In testimony whereof, I have hereunto set my hand this 26th day of October, 1922.

ARTHUR V. SOMERS.